United States Patent [19]

Bergquist et al.

[11] 4,115,592
[45] Sep. 19, 1978

[54] INSTANT DISSOLVING EGG WHITE

[75] Inventors: Dwight H. Bergquist, Springfield, Mo.; Franklin E. Cunningham, Manhattan, Kans.; Robert M. Eggleston, Winnipeg, Canada

[73] Assignee: Henningsen Foods Inc., White Plains, N.Y.

[21] Appl. No.: 586,653

[22] Filed: Jun. 13, 1975

Related U.S. Application Data

[63] Continuation of Ser. No. 89,045, Nov. 12, 1970, abandoned, which is a continuation-in-part of Ser. No. 670,405, Sep. 25, 1967, abandoned.

[51] Int. Cl.² .................................................. A23B 5/06
[52] U.S. Cl. ...................................... 426/32; 426/103; 426/96; 426/471; 426/614; 426/302
[58] Field of Search .................... 426/32, 96, 302, 614, 426/658, 455, 456, 464, 471, 473, 506

[56] References Cited

U.S. PATENT DOCUMENTS

| 2,358,324 | 9/1944 | Frey | 426/32 |
| 2,900,256 | 8/1959 | Scott | 426/506 |
| 2,950,204 | 8/1960 | Publes | 426/614 |

OTHER PUBLICATIONS

*Condenser Milk and Milk Powders,* (6th ed.), Hewziker, 1946.

*Primary Examiner*—Norman Yudkoff
*Attorney, Agent, or Firm*—Holland, Armstrong, Wilkie & Previto

[57] ABSTRACT

A process for preparing dried egg white having improved flow and water solubility characteristics includes spray coating dried egg white particles with an aqueous 40%–80% solution of sucrose to form a substantially complete and uniform coating comprising from 15% to 35% of the total weight of the coated particles, sifting and drying the coated particles to less than 6% by weight moisture content.

10 Claims, No Drawings

INSTANT DISSOLVING EGG WHITE

CROSS-REFERENCE TO RELATED APPLICATION

This is a continuation of application Ser. No. 89,045 filed Nov. 12, 1970, now abandoned, which was a continuation-in-part of Ser. No. 670,405 filed Sept. 25, 1967, now abandoned.

BACKGROUND OF THE INVENTION

The present invention relates to an improved powdered egg white and more particularly to an improved free flowing instantly dissolved and non-dusty powdered egg white and to its method of manufacture.

Although the manufacture of spray dried or pan dried and milled egg white are commonly known processes now employed in manufacturing large quantities of powdered egg white, the egg white thus manufactured still exhibits certain undesirable qualities and particularly is somewhat objectionable in that the dried egg white does not readily flow nor dissolve rapidly enough and includes a high percentage of dust-like particles. Attempts to improve these physical characteristics of the powdered egg white have failed to result in an increase in the rate of the water solubility.

Attempts have been made to improve the solubility and flow and to reduce the dust by agglomeration of the egg white particles into larger particles. It has been suggested, for example, that such an agglomeration be done by partially wetting the dried powder and by then redrying is so that the powder tends to ball-up or form lumps which facilitate powder flow. This agglomerated egg white when used in the preparation of food products has tended to form gummy partially rehydrated layers surrounding powdery centers. Considerable agitation and other effort has been required to fully disperse and dissolve the egg white in water.

Attempts to improve the physical characteristics of the dried egg white including its solubility have also included co-drying the egg white with a sugar solution followed by an agglomeration step. This gave some improvement in the flow and appearance of the product but did not result in improved dissolving properties.

It is known in the art to improve the flow characteristics of egg white by the dry admixing of spray dried egg white with from 25 to 50% of powdered lactose and then adding to the dry mix an amount of moisture of the order of 15 to 20% to form an initially moist sticky porous random aggregate which is subsequently dried, and process of this type is disclosed in U.S. Pat. Nos. 2,950,204 and 3,062,665; however, this procedure does not appear to provide the egg white particles with a uniform or subtantially complete coating of the lactose.

GENERAL DESCRIPTION OF THE INVENTION

In the process of the present invention, a desirable degree of flowability and powder reduction has been obtained with a substantially increased solubility by a process of coating spray dried egg white with a sugar solution under certain conditions, as described below, which cooperate to provide a dried egg white product having excellent whipping and other reconstitution properties.

Accordingly, an object of the present invention is to provide an improved powdered egg white and its method of manufacture.

Another object of the present invention is to provide an egg white powder with improved flowability and reduced dust combined with substantially instant water solubility.

Another object of the present invention is to provide a process of the above described nature for improving the flowability of powdered egg white.

Another object of the present invention is to provide an improved spray dried powdered egg white having improved properties and being made by a process adding little increase in cost over prior processes.

Other and further objects of the invention will be obvious upon an understanding of the illustrative embodiment about to be described or will be indicated in the appended claims, and various advantages not referred to herein will occur to one skilled in the art upon employment of the invention in practice.

In accordance with the present invention, it has been found that greatly improved flow and water solubility or dispersibility characteristics can be imparted to dried egg white by a process comprising the steps of spray coating dried egg white with an aqueous solution of cane or beet sugar (sucrose) having a selected concentration range, so that there is formed a substantially uniform and complete coating of sugar around the egg white particles. The resulting coating comprises from about 15 to about 35%, and preferably from about 17 to about 30% of the tital weight of the coated egg white particles, expressed on the dry basis. Thereafter the sugar-coated egg white is sifted to prevent the particles from forming clumps, and the coated egg white particles are dried to a final moisture content less than about 6%, and preferably less than about 4%, by weight.

Advantageously, the starting material is obtained by spray drying liquid egg white to a moisture content below about 5% by weight. Such spray drying may be performed in any conventional type of spray drying equipment, such as a Rogers spray dryer, employing elevated temperatures and pressures. The temperature should be high enough to remove moisture efficiently but without adverse effects upon the egg white. It has been found that the relatively larger spray dried egg white particles, e.g. those dried at about 800 pounds per square inch pressure, are more readily coated with the sucrose solution and do not require as heavy coatings as do the particles spray dried at higher pressures. Thus, for example, using a sucrose solution containing 62% sucrose by weight, egg white particles dried at a pressure of about 800 psi will receive a coating comprising about 17.5% of the total weight of the coated particles, and will consume about 4.8 pounds of sugar solution for each 15 pounds of egg white. On the other hand, thicker coatings are required for egg white spray dried at higher pressures. Thus, an egg white spray dried at about 1000 to about 1200 psi will require about 7 pounds of sucrose solution to provide a coated particle containing about 23% by weight of coating.

The aqueous sugar solution employed for coating the previously prepared spray dried egg white may contain between about 40 and about 80% sucrose by weight. At the upper limit, however, it may be necessary under some conditions to maintain the solution at elevated temperature to prevent crystallization. The preferred solution is one containing 62% sucrose and 38% water, by weight.

The sugar solution or syrup is applied to the dried egg white to form substantially completely and uniformly coated egg white particles. This is done preferably by agitating the egg white powder while subjecting it to a spray of the coating syrup. In order to form a substantially complete and uniform coating it has been found desirable to employ a very fine spray. The thickness of the applied coating may be controlled by applying a predetermined weight of syrup to a predetermined weight of the powdered egg white. The manner in which this is done in practice selection of spraying pressures has been illustrated above.

It has been determined that improved flow and dispersion characteristics of the dried egg white are obtained where a substantially complete sugar coating is formed on the particle surfaces and that this result is best obtained in general by using a very fine spray for the coating syrup which is applied as the particles are exposed to the spray by one form of agitation or another.

As already indicated, it is desirable to dry the coating while preventing it from forming clumps of the coated particles. A preferred means of accomplishing this passes the powder through a gyratory sifter to spread the powder lightly onto drying pans and then passes these pans through a tunnel drier which may be set at about 120° F. for a drying time of about one hour to reduce the moisture in the coating to a preferred range of about 5 to 6 percent.

Almost all of the completed product with the dried coating formed by the above process will now be found to pass through an 18 mesh screen. The small portion which does not pass through a screen of about this size may be milled and reworked so that it will pass through the screen for addition to the completed batch.

Other methods of powder agitation may be used for the syrup coating which will disperse the powder and expose the particle surfaces to the high pressure syrup spray during the coating operation. For example, the particles may be agitated by a flow of air which moves the particles into the spray pattern of the syrup spraying nozzles and which also may be heated to perform at least a portion of the coating drying steps.

Another embodiment of the new method which has been found to produce excellent results and in many cases improved product solubility includes an additional step of spraying a coating of a surface active agent, such as sodium lauryl sulphate or other well known anionic or nonionic surfactants, over the syrup coating previously applied by the above described method. The addition of about 0.1 percent or less by weight of the surfactant to the albumen solids provides additional improvements in the flowability and in particular in the water solubility of the dried egg white.

In another embodiment of the coating method it has been found advantageous to include a preliminary enzyme treatment of the liquid egg white prior to the spray drying step. This treatment has been found to improve the flowability and dispersion characteristics for coated egg white in certain instances and particularly where the process is being carried out for relatively small quantities of product in an intermittent batch-type operation.

The liquid egg white is treated with a proteolytic enzyme such as pancreatin. Pancreatin may be added, for example, in the amount by weight of about 0.005 to 0.10 percent to the liquid egg white. The drying process is then continued as described above.

The completed egg white made in accordance with the above described process may be used in baking and other food preparing processes in the same manner as presently produced powdered egg whites and when thus used exhibits the improved properties described above and particularly the improved flowability and water solubility as indicated.

It thus is seen that an improved powdered egg white has been provided for use in all regular applications of this product.

DESCRIPTION OF THE PREFERRED EMBODIMENTS

The following examples illustrate the practice of the invention but are not to be regarded as limiting:

Example 1

Egg white liquid was processed to remove naturally present glucose and was spray dried on a Rogers spray dryer, using a pump pressure of 800 psig and temperature conditions to give a moisture of 5%. Fifteen pounds of this spray dried egg white were measured into a 60-quart Hobart mixer with wire whip attachment. A sugar solution was prepared by dissolving 5 pounds of granular sugar (sucrose) in three pounds one ounce of water and was sprayed into the spray dried egg white as it was being mixed at medium speed. The sugar solution was sprayed through a pressure nozzle at 1500 psig and total time to apply all of the solution to the spray dried egg white was about 90 seconds. After all of the sugar solution was applied, speed of the mixer was increased to high speed and mixing was continued for an additional 60 seconds. The mixture of spray dried egg white and sugar solution was then sifted through a 12 mesh screen onto trays giving a product thickness of about ¼ inch, the trays were passed through an air dryer, and the material was dried to a moisture of 3–4%. The dried product was sifted through a 12 mesh screen and was tested by adding one level teaspoon to 50 ml. of water. The mass of material was completely wetted within seconds and was dispersing through the water. With a slight stirring action, all of the material was dissolved.

Example 2

Spray dried egg white was prepared as in Example 1 and was fed pneumatically to a sugar solution application chamber at a rate of 150 pounds dried egg white per hour. A sugar solution containing 62 parts by weight of sugar (sucrose) and 38 parts by weight of water was sprayed into the dried egg white as it entered the sugar solution application chamber at a rate of 80.7 pounds sugar solution per hour (50 pounds sugar per hour; 30.7 pounds water per hour). The mixture of dried egg white and sugar solution coming out of the application chamber was then mixed continuously through a mixing auger, or screw conveyor, and was fed to continuous dryer which reduced moisture content to about 3%. Product from the dryer was sifted and tested. This product had the same characteristics as the product produced from Example 1.

What is claimed is:

1. Process for preparing dried egg white having improved flow and water solubility characteristics consisting of the steps of:
   (a) spray coating dried egg white particles with an aqueous solution of sucrose containing between about 40 and about 80% sucrose by weight while agitating the particles to form a substantially complete and uniform sucrose coating over said particles, the resulting coating comprising from about 15 to about 35% of the total weight of the coated particles, on a dry basis;

(b) sifting the coated egg white particles to prevent formation of clumps; and (c) drying the still substantially completely coated particles to reduce the moisture content thereof to about 3 to 6% by weight.

2. The process of claim 1 in which the dried egg white starting material is prepared by spray drying liquid egg white.

3. The process of claim 2 in which the liquid egg white starting material is treated with a proteolytic enzyme prior to drying.

4. The process of claim 3 in which the enzyme is pancreatin in an amount between about 0.005 and about 0.10 percent by weight upon the liquid egg white.

5. The process of claim 1 in which the aqueous solution of sucrose contains about 62% by weight of sucrose, balance water.

6. A sucrose-coated egg white prepared by the process of claim 1.

7. A sucrose coated dried egg white powder having improved flow and water solubility characteristics comprising:

(a) spray coated dried egg particles having a substantially complete and uniform sucrose coating over said particles comprising from about 15 to about 35% of the total weight of the coated particles on a dry basis; and (b) the coated and dried particles having a moisture content of about 3 to 6% by weight.

8. Process for preparing dried egg white having improved flow and water solubility characteristics comprising the steps of:

(a) spray coating dried egg white particles with an aqueous solution of sucrose containing between about 40 and about 80% sucrose by weight while agitating the particles to form a substantially complete and uniform sucrose coating over said particles, the resulting coating comprising from about 15 to about 35% of the total weight of the coated particles, on a dry basis;

(b) sifting the coated egg white particles to prevent formulation of clumps; and (c) drying the still substantially completely coated particles to reduce the moisture content thereof to about 3 to 6% by weight.

9. The process of claim 8 in which the aqueous solution of sucrose contains about 62% by weight of sucrose with the balance water.

10. The process of claim 8 which further comprises adding a coating of a surfactant in an amount about 0.1% by weight based upon the weight of the dried egg white.

* * * * *